Oct. 31, 1961  W. T. HARRIS  3,007,063
MAGNETOSTRICTIVE ACTUATOR
Filed Jan. 10, 1958  3 Sheets-Sheet 3
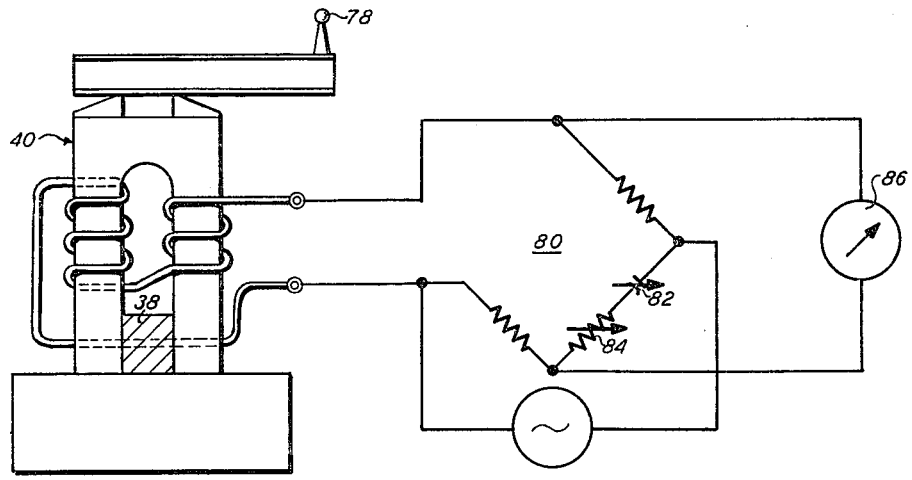
FIG. 12
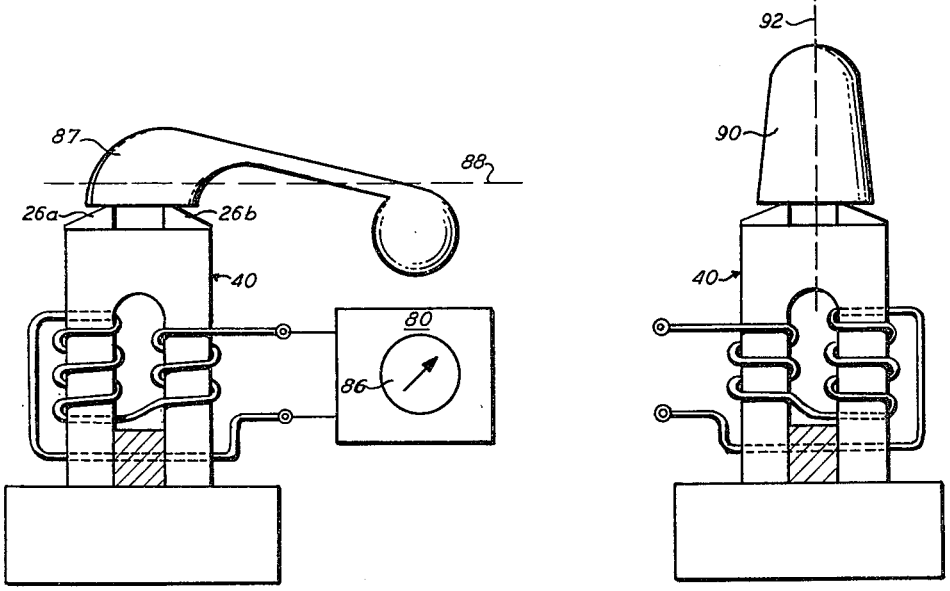
FIG. 13
FIG. 14
INVENTOR
WILBUR T. HARRIS
BY Mitchell & Bechert
ATTORNEYS 3,007,063
MAGNETOSTRICTIVE ACTUATOR
Wilbur T. Harris, Southbury, Conn., assignor to The Harris Transducer Corporation, Woodbury, Conn., a corporation of Connecticut
Filed Jan. 10, 1958, Ser. No. 708,292
17 Claims. (Cl. 310—26)

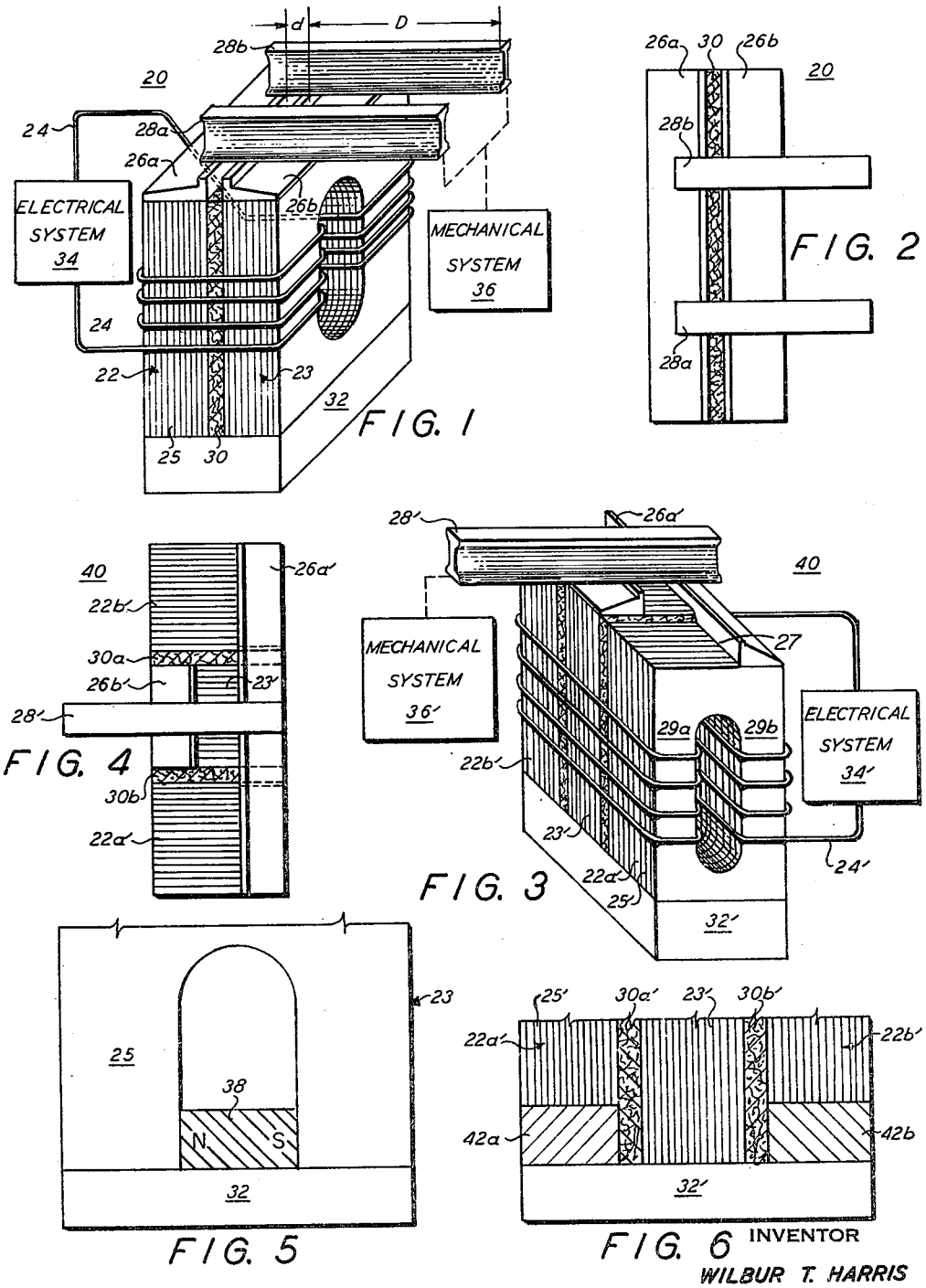

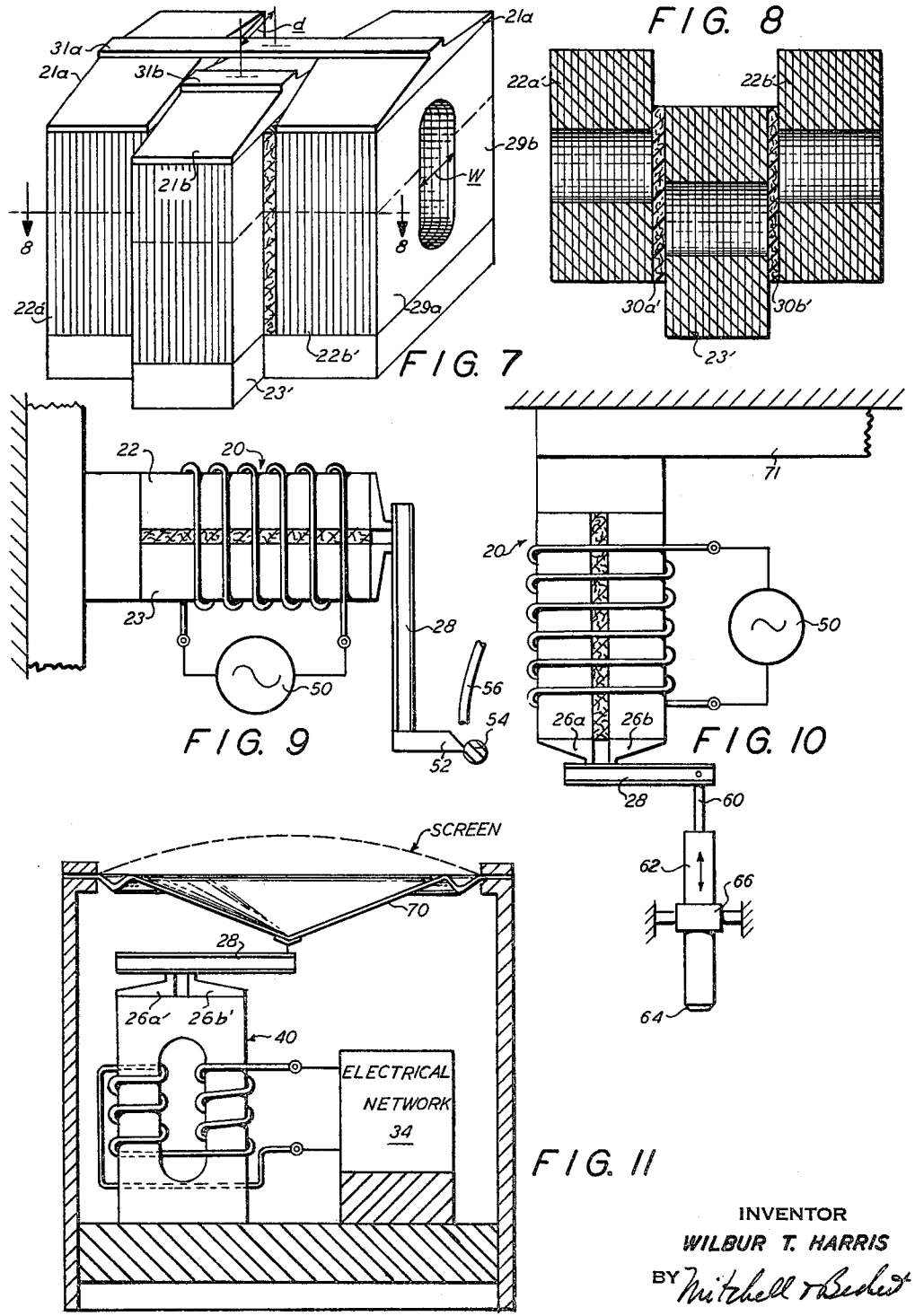

This invention relates to transducers and more particularly to magnetostrictive elements for transferring energy between physical systems.

Transducers or energy-conversion and transfer elements are used in many fields to convert one form of energy to a second form of energy. One of the more common applications is in the conversion between electrical and mechanical systems. For example, a transducer is employed to convert an electrical signal to a mechanical movement. The converse is equally common; a mechanical displacement is changed to an electrical quantity.

Although there are many electromechanical transducers, there are some electromechanical conversions which are more demanding on the known transducers. In particular, it is difficult with known electrically excited transducers to produce a very rapid, precise, mechanical displacement with usable force. The converse is often equally difficult, i.e. mechanical displacements are not linearly transduced to electrical signals.

One approach for converting an electrical quantity to a mechanical quantity has been the use of a magnet and a "voice coil" (a conventional electrodynamic speaker). Such a device is satisfactory for generating small mechanical displacements, provided the moving mechanical element is lightly loaded. When the moving mechanical element is expected to exert a useful force, this kind of transducer must be extremely large. Conventional solenoids, although they are capable of exerting the desired forces, have slower response times and cannot produce truly linear movements.

It is therefore an object of the invention to provide an improved transducer.

It is another object of the invention to provide an improved magnetostrictive transducer element for performing energy conversions between electrical and mechanical systems.

It is a further object of the invention to provide an improved magnetostrictive transducer which is rapidly responsive to excitations.

It is a still further object of the invention to provide an improved magnetostrictive transducer which is capable of rapidly exerting usable forces through short distances.

It is a general object of the invention to meet the above objects with an improved magnetostrictive transducer which is small, compact and rugged.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a simplified perspective view of a magnetostrictive transducer in accordance with one embodiment of the invention;

FIG. 2 is a top view of the transducer of FIG. 1;

FIG. 3 shows, in perspective, a magnetostrictive transducer in accordance with a second embodiment of the invention;

FIG. 4 is a top view of the transducer of FIG. 3;

FIG. 5 is a side view of a portion of the magnetostrictive transducer similar to that of FIG. 1 but representing another embodiment of the invention;

FIG. 6 is a side view of a portion of the transducer, as in FIG. 3, but in accordance with yet another embodiment of the invention;

FIG. 7 is a perspective view of an alternate embodiment for positioning the stacks of laminations in a magnetostrictive transducer of my invention;

FIG. 8 is a sectional view along the lines 8—8 of FIG. 7;

FIG. 9 shows application of my magnetostrictive transducer employed in an ultrasonic saw;

FIG. 10 illustrates my magnetostrictive transducer as applied in an ultrasonic drill;

FIG. 11 illustrates my magnetostrictive transducer as an electro-acoustic energy converter;

FIG. 12 shows my magnetostrictive transducer as a means for converting a mechanical displacement into an electrical quantity;

FIG. 13 illustrates an accelerometer employing my magnetostrictive transducer; and FIG. 14 shows another mass configuration for the accelerometer of FIG. 13.

Briefly, in accordance with a general aspect of the invention, I provide a class of transducers which include a magnetostrictive element having a winding disposed about a portion of its structure for coupling to an electrical system. A lever means is operatively disposed with respect to the magnetostrictive element for coupling to a mechanical system.

In one aspect of the invention, an electrical signal from the electrical system causes a dimensional change in the magnetostrictive element. The dimensional change is transferred by the lever means to a displacement in the mechanical system.

In another aspect of the invention, a displacement in the mechanical system is transformed via the lever means to a dimensional change in the magnetostrictive element, causing a related change in its electrical characteristics. This change in electrical characteristics causes a modification of the response of the electrical system.

Referring to FIGS. 1 and 2, a transducer 20 is shown according to one embodiment of the invention for performing energy conversions between an electrical system 34 and a mechanical system 36.

The transducer 20 comprises the magnetostrictive elements 22 and 23, bonded to a base 32. The magnetostrictive elements 22 and 23 are each a bonded stack of windowed laminations 25. A winding 24, threading both legs of each stack in either a series or parallel aiding manner, is coupled to an electrical system 34. The spacer 30, preferably of mica, provides a predetermined separation between the magnetostrictive elements 22 and 23. Brazed across the tops of each of the elements 22 and 23 are the heads 26(a—b) provided with pivot (or fulcrum) edges. Although one bar would suffice in many applications, two bars 28(a—b) are shown brazed to the pivot edges of the heads 26(a—b) and coupled to the mechanical system 36; it will be understood throughout the specification and claims that the term "pivot" is used to define a point of force application between two slightly movable members, and that conventional pin connections or otherwise-disconnected knife-edge engagements are not necessarily contemplated by the term, brazed connections being satisfactory, as indicated.

The laminations 25 of the magnetostrictive elements 22 and 23 are fabricated from ferromagnetic materials having different magnetostrictive coefficients. For example, the laminations of the magnetostrictive element 22 may have a positive magnetostrictive coefficient (i.e., the material experiences a dimensional expansion in a direction parallel to an applied magnetic field), while the laminations of the magnetostrictive element 23 have a negative magnetostrictive coefficient (i.e. contracts in the presence of a similarly applied magnetic field).

Many materials having these properties are available either as cast ferrites or as ferromagnetic sheets. The positive magnetostrictive coefficient materials may be nickel-iron, cobalt-iron, or aluminum-iron alloy sheets or cobalt-nickel ferrites, and the negative magnetostrictive coefficient materials may be pure nickel sheets or cast nickel ferrites.

In any case, the magnetostrictive element 22 should have a different magnetostrictive coefficient than the magnetostrictive element 23. Thus, when a steady electrical signal passes through the winding 24, a constant magnetic field is established in (the flux-path loops of) the elements 22 and 23 causing, say, the magnetostrictive element 22 to elongate and the magnetostrictive element 23 to shorten. In particular, an increase of the height of the element 22 and a decrease of the height of the element 23 result in the differential displacement of the heads 26(a—b) which causes a corresponding rotation of the bars 28(a—b). This rotation of the bars 28(a—b) is clockwise in the sense of FIG. 1 and causes a linear displacement in the mechanical system 36.

In a particular application, the transducer functions as an actuator which must exert a force of at least sixteen pounds through a distance of two thousandths of an inch in less than a quarter of a millisecond. To accomplish this result, laminations of low-retentivity ferromagnetic material three inches tall and having cross-sectional areas (the product of thickness and depth) of one half a square inch were employed having magnetostrictive coefficients of plus and minus $3 \times 10^{-5}$ in./in. When a direct-current signal energizes the winding 24, the relative displacement of the pivot edges of the heads 26(a—b) is 0.0002 inch. By choosing the distance D from the operative end of the bars 28(a—b) to the pivot edges to be ten times greater than the distance $d$ between the pivot edges, a multiplication factor of ten is obtained. Thus, the operative ends of the bars 28(a—b) are displaced the required 0.002 inch.

In laminated forms (i.e. not ferrites), the laminations are suitably thin to permit a very rapid polarization, unimpeded by eddy currents. Similarly, the dimensions of the laminations are such as to permit the exertion of the required force without any significant clamping effect on the magnetostrictive elements 22 and 23.

In applications wherein the transducer 20 functions as a vibrator, the electrical system 34 includes a source of alternating current to feed the winding 24. In addition, the magnetostrictive elements 22 and 23 are permanently magnetically biased. This biasing may be accomplished by adding a direct-current component to the signal feeding the winding 24 or by using permanently magnetized laminations. However, FIG. 5 shows an alternative method of establishing the magnetic bias, a permanent magnet 38 (e.g. a permanently magnetized ferrite block) being substituted for a portion of each of the laminations 25, and preferably joining corresponding ends of the legs of each laminated core 22—23.

Although the transducer 20 has been described as a means for converting electrical energy to mechanical energy, the opposite conversion is equally possible. For this conversion, the converse magnetostrictive property is employed, i.e., that a strain applied to a magnetostrictive material changes the magnetization of the material. Thus, if the electrical system 34 includes means sensitive to changes in impedance (the winding 24 and the magnetostrictive elements 22 and 23 constitute a reactive element), any rotation of the bars 28(a—b) about the pivot edges of the heads 26(a—b) strains the elements, causing an impedance change.

The transducer 20, as shown in FIGS. 1 and 2, is suitable for many applications, but there are some which require much greater flexural stiffness or much less flexural sensitivity. Accordingly, FIGS. 3 and 4 show a symmetrical transducer 40 which satisfies these requirements. Since the symmetrical transducer 40 is similar in many respects to the transducer 20, corresponding elements will be denoted by primed reference characters, and only the basic differences will be pointed out.

Three magnetostrictive elements are employed. The center magnetostrictive element 23' is composed of bonded laminations 25' having, say, a negative magnetostrictive coefficient, whereas the outer magnetostrictive elements 22(a'—b') are composed of bonded laminations 25' having the same positive magnetostrictive coefficient. Brazed to the magnetostrictive element 23' is the head 26b', while the head 26a' is brazed to both the magnetostrictive elements 22(a'—b'). It should be noted that a suitable operational clearance is obtained between the bottom of the head 26a' and the top of the magnetostrictive element 23' by providing feet 27 on opposite ends of the base of the head 26a'. It should be further noted that the heads 26(a'—b') are shown greatly separated for the sake of clarity. In operation, this spacing is much closer. The symmetrical transducer 40 (of FIGS. 3 and 4) operates in the same manner as the transducer 20 (of FIGS. 1 and 2) and may be similarly coupled and used with mechanical and electrical systems.

Since different ferromagnetic materials are employed in the magnetostrictive elements, which in general, have different coefficients of thermal expansion, any ambient heating causes a differential displacement of the heads. In precision actuators which must deflect from one static position to another and in displacement-measuring devices, this differential displacement cannot be tolerated. Therefore, temperature compensation must be employed.

In FIG. 6, means are shown for providing temperature compensation whenever the ambient temperature is such as to affect the sensitivity of the transducers. Although the temperature-compensation means are shown for the symmetrical transducer 40, this means is equally applicable to the transducer 20.

The thermal compensation is accomplished by shortening the magnetostrictive elements having the lesser thermal-expansion coefficient and making up the length with a metal having a thermal-expansion coefficient which is greater than the thermal-expansion coefficient of the material in the unshortened legs. For example, if the center magnetostrictive element 23' comprises nickel laminations, and the outer magnetostrictive elements 22(a'—b') are of nickel-iron laminations, brass elements 42-(a—b) may be substituted for portions of the laminations 25' of the outer magnetostrictive elements 22(a'—b').

In some applications of the symmetrical transducer 40, it is more desirable for the bar 28' (FIG. 3) to exert equal stresses on the legs 29(a—b) of each of the magnetostrictive elements. Accordingly, FIGS. 7 and 8 show a modification of the magnetostrictive transducer 40 to permit the transfer of equal forces between the legs 29(a—b) and the bar 28.

The head 21a is bonded to the outer magnetostrictive elements 22(a'—b'). The pivot or fulcrum edge 31a of the head 21a is positioned midway between the legs 29(a—b). Similarly, the head 21b is bonded to the inner magnetostrictive element 23' with its pivot or fulcrum edge 31b centrally positioned. With such a construction, it may be necessary to undercut a portion of the head 21a to accommodate a portion of the head 21b. In addition, it will be necessary to offset the inner magnetostrictive element 23' from the outer magnetostrictive elements 22(a'—b'), as shown in FIG. 8. The amount of offset is dependent on the operating distance $d$ between the heads 21a and 21b and the effective thickness of the pivot edges 31. In any case, however, the extent of the offset $d$ in FIG. 7 should be less than the effective width $w$ of lamination-window openings, so that windings may simultaneously link all flux-loop paths in the various transducer cores, as previously described.

The discussion has thus far been concerned with two general types of transducers, and the discussion which follows is concerned with specific applications. It will thus be understood that, whatever the specific transducer showing of FIGS. 9 to 14, the showing is merely illustrative and that the other transducer form may also be employed.

FIG. 9 shows an ultrasonic saw comprising the transducer 20 energized by an ultrasonic frequency alternating-current source 50. The bar 28 is connected to a carbide, tool-steel, or other cutting means 52 for cutting a workpiece 54, such as a jewel or crystal. The tube 56 is ordinarily connected to either a coolant or an abrasive reservoir. It should be noted that since the transducer 20 is functioning as a vibrator, its magnetostrictive elements 22 and 23 must be magnetically biased using one of the heretofore-described methods.

In FIG. 10, an ultrasonic drill is shown to comprise a transducer 20 mounted on a rigid support 71, the transducer 20 being again excited by the ultrasonic frequency A.-C. source 50. Since vibrator action is again called for, a magnetic bias is required in the transducer 20. A coupling means 60 transmits the periodic vibrations to a resonatable rod 62 having a hardened bit 64 at one end and supported at its center by a rigid member 66. The length of the resonatable rod 62 is related to the excitation frequency. For a centrally clamped rod, the length of the rod is preferably chosen to be one half the wavelength of the excitation frequency. At resonance, the resonatable rod 62 undergoes longitudinal expansions and contractions. These expansions and contractions permit the hardened bit 64 to cut into a workpiece. At the same time, the resonant rod 62 acts as a buffer between the transducer 20 and the workpiece.

In addition to energizing tools, my transducers may be used as converters between electrical and acoustical energy. For example, in FIG. 11 a symmetrical transducer 40 is shown coupling an electrical network 34 to a diaphragm 70. When the electrical network 34 is a source of audio frequencies, such as the audio-output stage of a radio, the symmetrical transducer 40 is coupled to the diaphragm 70 to provide a speaker. Conversely, when the electrical network 34 includes voltage-sensing or impedance-sensing means, the symmetrical transducer 40 is coupled to the diaphragm 70 to provide a microphone. In the microphone application, displacements of the diaphragm 70 cause voltage variations or variations of the impedance presented to the electrical system 34 by the symmetrical transducer 40, as previously described. These variations can be used to modulate a signal generated in the electrical system 34. It should be noted that in this application magnetic bias is required.

For the exact measurement of mechanical displacements, a very precise static-measuring instrument is provided by the apparatus of FIG. 12. Basically, a magnetically biased symmetrical transducer 40 couples a stylus 78 to a conventional A.-C. impedance bridge 80. By suitably disposing the stylus 78 with respect to a mount, a profilometer or surface-roughness gauge is obtained. Similarly, by replacing the stylus with a feeler which cooperates with an appropriate mount, the static-measuring instrument may be a micro-inch micrometer, indicator, or displacement gauge. Also, if the stylus 78 is disposed against the diaphragm portion of a fluid chamber or reservoir, a precise pressure gauge is obtained. In any of these applications, a movement of the stylus 78 changes the impedance presented by the symmetrical transducer 40 to the A.-C. impedance bridge 80. This impedance is considered to be the unknown arm of the bridge. As the impedance changes, the variable capacitor 82 and variable resistor 84 are manually varied until a null is indicated by the meter 86. By suitably calibrating dials (not shown, but associating the variable capacitor 82 and resistor 84 with the quantities being measured), direct readings of the mechanical displacements or pressures are obtained.

It should be noted that in order to minimize the forces required to produce the displacements in measuring these mechanical displacements, the width of the magnetostrictive elements should be suitably thin. In fact, since the signal generator for the A.-C. bridge can be the commercially available sixty-cycle line voltage, there is no eddy-current problem. Therefore, each of the magnetostrictive elements may be a single piece of ferrite having a thickness of, say, a sixteenth of an inch.

In addition to measuring mechanical displacements, these transducers can be employed in measuring accelerations. By referring to FIG. 13, an accelerometer is shown comprising the symmetrical transducer 40 which couples the mass 87 to the A.-C. impedance bridge 80. In this particular application, the accelerations being measured are along a direction perpendicular to the plane 88. If there is a component of acceleration in a direction perpendicular to the plane 88, there is a rotation of the mass 87 about the heads 26 ($a'$—$b'$) which stresses the magnetostrictive elements, resulting in the change of the impedance-bridge balance as previously described.

When lateral accelerations are to be measured, the configuration of FIG. 14 is used. In this case, the mass 90 is a solid of revolution symmetrical to the axis 92. Except for the geometry of the mass 90, this accelerometer is identical to the accelerometer of FIG. 13.

It should be noted that in all the static-measuring instruments a magnetic bias is required for the transducers. This polarization is necessary since the magnetostrictive effect disappears for small signals or strains when there is no magnetic flux in the ferromagnetic materials. Also, since the state of zero remanent flux is not easily reproducible, a stable permanent polarization is necessary for maintaining a stable calibration.

It will be seen that I have described an improved transducer which by employing magnetostrictive elements permits very precise conversions between electrical and mechanical energy. The device is relatively small and rugged. It not only lends itself readily to applications wherein very precise displacements are required, but also to applications demanding ultrasonic mechanical vibrations. The device in addition is applicable to operations wherein very precise small magnitude measurements are required.

While the invention has been described in detail in connection with the preferred forms illustrated, it will be understood that modifications may be made within the scope of the invention as defined in the claims which follow.

I claim:
1. A transducer for coupling between an electrical network and a mechanical system, comprising a first magnetostrictive element having a first magnetostrictive coefficient, a second magnetostrictive element having a second and different magneostrictive coefficient, said first and second magnetostrictive elements being spaced from each other, winding means developed about portions of said first and second magnetostrictive elements and coupled to the electrical network, a first lever-supporting means connected to an end of said first magnetostrictive element, a second lever-supporting means connected to a corresponding end of said second magnetostrictive element, and lever means connected to said first and second lever-supporting means for coupling to the mechanical system.

2. The apparatus of claim 1, wherein the magnetostrictive elements are slabs of ferrites.

3. The apparatus of claim 1, wherein the magnetostrictive elements are blocks developed from bonded stacks of laminations fabricated from ferromagnetic sheet material.

4. The apparatus of claim 1, wherein the magnetostrictive elements are fabricated from a ferromagnetic material having low retentivity.

5. The apparatus of claim 1, wherein the magnetostrictive elements are fabricated from a ferromagnetic material which is permanently magnetized.

6. The apparatus of claim 1, wherein means are included for establishing a steady magnetic polarization in the ferromagnetic elements.

7. The apparatus of claim 1, wherein means are included for providing compensation for a thermal-expansion differential between said first and second magnetostrictive elements.

8. A symmetrical transducer having a minimum of lateral sensitivity for coupling between an electrical network and a mechanical system, comprising first and second magnetostrictive elements having a first coefficient of magnetostriction, a third magnetostrictive element having a second and different coefficient of magnetostriction, said first and second magnetostrictive elements being disposed on opposite sides of said third magnetostrictive element, a winding developed about portions of said first, second and third magnetostrictive elements, said winding being coupled to the electrical network, a first lever-supporting means being connected to corresponding ends of said first and second magnetostrictive elements, a second lever-supporting means connected to a corresponding end of said third magnetostrictive element, and a lever means connected to said first and second lever-supporting means for coupling to the mechanical system.

9. An actuator for moving a mechanical member, comprising a source of current, a first magnetostrictive element having a first magnetostrictive coefficient, a second magnetostrictive element having a second and different magnetostrictive coefficient, said first and second magnetostrictive elements being free of each other, a winding developed about portions of said first and second magnetostrictive elements, said winding being coupled to said source of current to provide a change in length of said first magnetostrictive element of a first magnitude and a simultaneous change in length of said second magnetostrictive element of a second and different magnitude, a first lever-supporting means extending from the end of said first magnetostrictive element, a second lever-supporting means extending from a corresponding end of said second magnetostrictive element, and a lever means connected to said first and second lever-supporting means, said lever means being adapted for coupling to the mechanical member to impart a translatory motion when said magnetostrictive elements are energized.

10. A tool comprising a source of alternating current, a first magnetostrictive element having a positive magnetostrictive coefficient, a second magnetostrictive element having a negative magnetostrictive coefficient, said magnetostrictive elements being permanently magnetized, a winding developed about portions of said first and second magnetostrictive elements, said winding being coupled to said source of alternating current for inducing a periodic expansion and contraction of said first magnetostrictive element and a corresponding contraction and expansion of said second magnetostrictive element, a first lever-supporting means extending from the end of said first magnetostrictive element, a second lever-supporting means extending from the end of said second magnetostrictive element, a cutting member, and a lever means connected to said first and second lever supporting means, said lever means being coupled to said cutting member to impart a vibratory motion.

11. The apparatus of claim 10 wherein said cutting member is a saw.

12. The apparatus of claim 10 wherein said cutting member includes a rod having a length equal to one half the wavelength of sound in the rod material when excited at the frequency of the alternating current, a clamping means for supporting the rod at the center of its length, and a bit disposed at one end of said rod.

13. An electromechanical transducer for performing interconversions between electrical and mechanical energy, comprising an electrical network, first and second magnetostrictive elements having a first magnetostrictive coefficient, a third magnetostrictive element having a second and different magnetostrictive coefficient, said first and second magnetostrictive elements being disposed on opposite sides of said third magnetostrictive element, means for magnetically polarizing said magnetostrictive elements, a winding developed about portions of said magnetostrictive elements, said winding being coupled to said electrical network, a first lever-supporting means connected to corresponding ends of said first and second magnetostrictive elements, a second lever-supporting means connected to a corresponding end of said third magnetostrictive element, and a lever means connected to said first and second lever supporting means for coupling to a source of mechanical energy.

14. The apparatus of claim 13, wherein said electrical network includes a source of alternating-current signals for energizing said magnetostrictive elements to vibrate said lever means.

15. The apparatus of claim 13, wherein the impedance of said electrical network is variable in response to deformation of said magnetostrictive elements resulting from movements of said lever means.

16. In combination, a displaceable member, a lever means coupled to said displaceable member, first and second lever supporting means connected to said lever means, first and second magnetostrictive elements having a first magnetostrictive coefficient and being connected to said first lever-supporting means, a third magnetostrictive element having a second and different magnetostrictive coefficient and being connected to said second lever-supporting means, said first and second magnetostrictive elements being disposed on opposite sides of said third magnetostrictive element, means establishing a permanent magnetization in said magnetostrictive elements, a winding developed about portions of said magnetostrictive elements, and an electrical network coupled to said winding, said electrical network being sensitive to changes in the electrical characteristics of said winding in response to movement of said displaceable member.

17. The apparatus of claim 1, in which said first and second magnetostrictive elements are operatively connected respectively to members having different temperature coefficients of expansion, thereby compensating for the thermal expansion differential between said first and second magnetostrictive elements.

References Cited in the file of this patent
UNITED STATES PATENTS

| | | |
|---|---|---|
| 1,438,974 | Wente | Dec. 19, 1922 |
| 2,240,278 | Abbot | Apr. 29, 1941 |
| 2,338,732 | Nosker | Jan. 11, 1944 |
| 2,421,578 | Reason | June 3, 1947 |
| 2,452,211 | Rosenthal | Oct. 26, 1948 |
| 2,461,635 | Feller | Feb. 15, 1949 |
| 2,621,260 | Sykes | Dec. 9, 1952 |
| 2,726,074 | Ketchledge | Dec. 6, 1955 |
| 2,774,194 | Thatcher | Dec. 18, 1956 |